United States Patent [19]
Shoda

[11] Patent Number: 5,468,101
[45] Date of Patent: Nov. 21, 1995

[54] WOOD WORKING MACHINE AND TABLE TRANSLATION APPARATUS FOR THE SAME

[76] Inventor: Isao Shoda, 116-4, Okaba-cho, Hamamatsu-shi, Shizuoka-ken, Japan

[21] Appl. No.: 270,836

[22] Filed: Jul. 5, 1994

[30] Foreign Application Priority Data

Jul. 5, 1993 [JP] Japan .................. 5-191731

[51] Int. Cl.⁶ .................. B23B 7/04; F16H 29/20
[52] U.S. Cl. .................. 409/202; 74/89.15; 108/20; 108/143; 198/465.1; 269/60; 408/91; 409/145
[58] Field of Search .................. 74/89.15; 108/20, 108/143; 144/1.00 A; 269/60, 73; 198/465.1; 408/91; 409/145, 159, 172, 202; 104/67, 172.2

[56] References Cited

U.S. PATENT DOCUMENTS

| | | | |
|---|---|---|---|
| 4,372,223 | 2/1983 | Iwatani | 108/143 |
| 4,530,251 | 7/1985 | Henle | 74/89.15 |
| 4,676,362 | 6/1987 | Malzkorn | 198/465.1 |
| 4,919,001 | 4/1990 | Ogiwara et al. | 74/89.15 X |
| 4,945,958 | 8/1990 | Shoda | 144/1 A X |
| 4,949,942 | 8/1990 | Shoda | 144/1 A X |
| 5,107,910 | 4/1992 | Sasaki | 144/1 A |
| 5,152,327 | 10/1992 | Shoda | 144/1 A |

FOREIGN PATENT DOCUMENTS 350402 5/1991 Japan .................. B27C 9/04

*Primary Examiner*—Charles A. Marmor
*Assistant Examiner*—Troy E. Grabow
*Attorney, Agent, or Firm*—Sughrue, Mion, Zinn, Macpeak & Seas

[57] ABSTRACT

A table translation apparatus for a wood working machine is disclosed wherein a table can be repetitively moved at a high speed within a small distance to enhance the working efficiency for wood. A pair of front and rear screw shafts are supported for rotation linearly at front and rear portions of a bed extending forwardly and backwardly and driven to rotate forwardly or reversely independently of each other by a motor. A pair of front and rear shuttles are held in threaded engagement with the front and rear screw shafts, respectively. A pair of front and rear side clutches for releasably connecting the table and the front and rear side shuttles to each other, respectively, are provided on the table mounted for forward and backward sliding movement on the bed. When the table is connected to the front side shuttle by the front side clutch, the table is moved forwardly or rearwardly by forward or reverse rotation of the front side screw shaft, but when the table is connected to the rear side shuttle by the rear side clutch, the table is moved forwardly or rearwardly by forward or reverse rotation of the rear side screw shaft. A wood working machine includes a pair of such table translation apparatus.

4 Claims, 4 Drawing Sheets

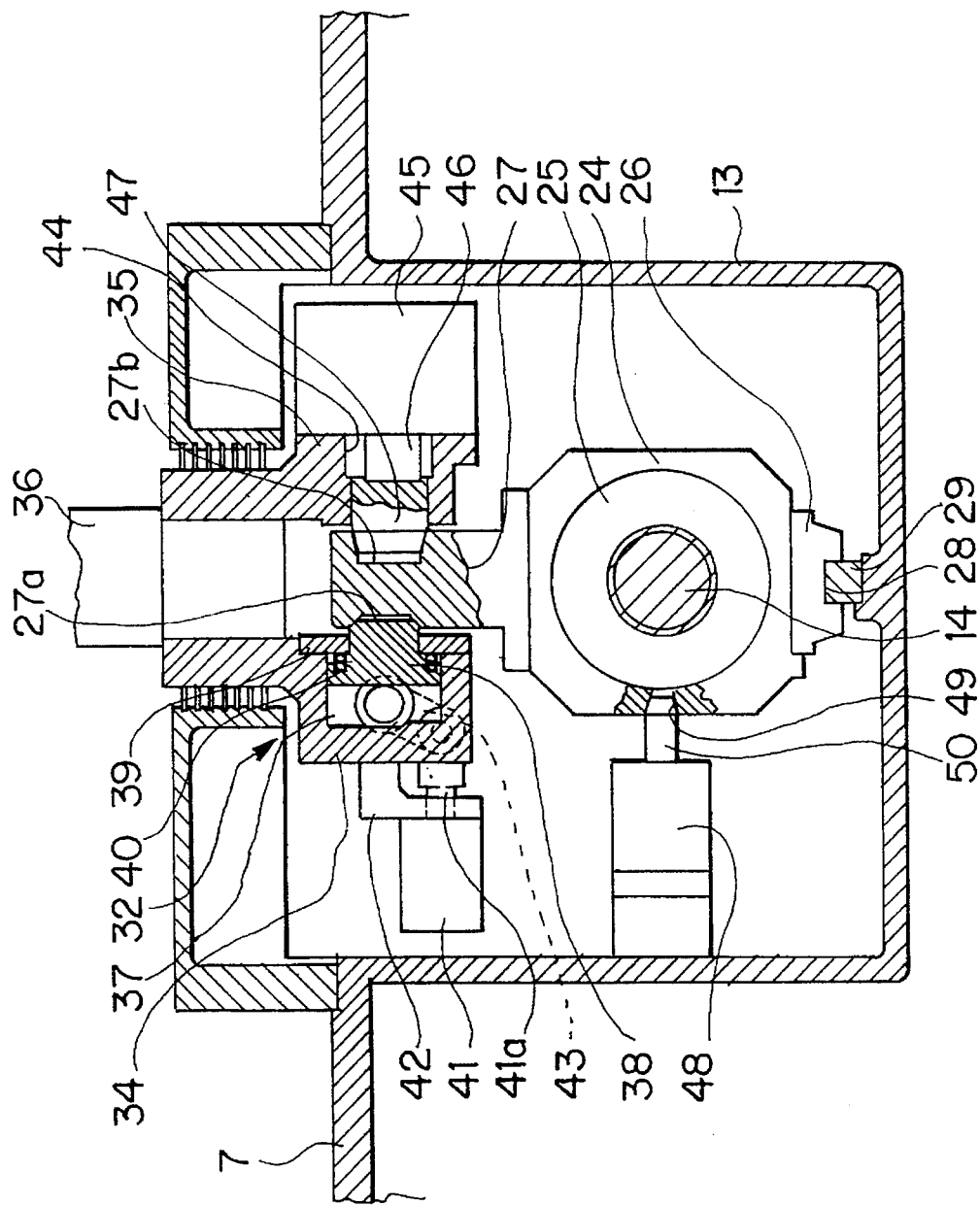

WOOD WORKING MACHINE AND TABLE TRANSLATION APPARATUS FOR THE SAME

BACKGROUND OF THE INVENTION

1. Field of the Invention

This invention relates to a wood working machine of the composite working type including a plurality of working heads for different working operations and a table translation apparatus for such wood working machine.

2. Description of the Related Art

A wood working machine of the composite working type has been proposed by the inventor of the present invention and is disclosed in Japanese Utility Model Laid-Open Application No. Heisei 3-50402. In the wood working machine, a chain conveyor is installed on a bed extending long in the depthwise direction, that is, in the forward and backward directions. The chain conveyor similarly extends long in the depthwise direction and is located higher than the top face of the bed, and a piece of wood to be worked is transported forwardly and backwardly by the chain conveyor. A sliding table is mounted on the bed and slidably moves forwardly and backwardly in a gap between the bed and the chain conveyor along a rail provided on the base. A screw shaft is supported for rotation on the bed and extends horizontally in the forward and backward direction. When the screw shaft is rotated forwardly or reversely by a motor, the sliding table is driven to move forwardly or backwardly between the front end and the rear end of the rail. A pair of left and right columns stand on the sliding table, and a cross beam is supported horizontally on the columns. The cross beam extends in the leftward and rightward directions above and perpendicularly to the chain conveyor, and the cross beam and the left and right columns exhibit an arch-like configuration so as not to interfere with the chain conveyor. A pair of carriers are mounted for leftward and rightward sliding movement on a front face and a rear face of the cross beam. A plurality of working heads each having a router or a like element principally for cutting wood are mounted for upward and downward movement on the front side carrier, and another plurality of working heads each having a drill or a like element principally for drilling wood are mounted for upward and downward movement on the rear side carrier.

In the wood working machine, in order to move the working position for wood in the forward or backward direction, the screw shaft is rotated forwardly or backwardly by the motor to slidably move the sliding table forwardly or backwardly on the bed together with the cross beam and the left and right columns. On the other hand, in order to move the working position for wood leftwardly or rightwardly, the carriers are moved leftwardly or rightwardly on the beam.

With the wood working machine, however, although transportation of wood is performed efficiently by the chain conveyor, since the weights of the front and rear carriers, the large number of working heads and so forth are applied to the sliding table together with the weights of the left and right columns and the cross beam, a great driving force is required to slidably move the sliding table of the great weight. However, since the sliding movement of the sliding table is performed by rotation of the single screw shaft, the sliding table cannot be slidably moved rapidly. Further, since the sliding table is slidably moved forwardly and backwardly by the single screw shaft, the screw shaft has a great length as much and cannot be rotated at a high speed. In order to work a piece of wood compositely in various manners, relative movement between the wood and each working head is required to be performed rapidly and repetitively within a short distance, and since a low speed of rotation of the screw shaft results in low forward or backward movement of the working head, composite workings cannot be performed efficiently on the wood working machine. Further, an increase of the length of the screw shaft increases deflections of the screw shaft upon rotation, and in order to prevent such deflections upon rotation, some countermeasure such as to increase the diameter of the screw shaft or to provide a support for preventing deflections upon rotation must be taken. This results in requirement for a further high driving force and complicated structure.

SUMMARY OF THE INVENTION

It is an object of the present invention to provide a wood working machine and a table translation apparatus for such wood working machine wherein a screw shaft can be driven to rotate by a comparatively low driving force with a simple structure.

It is another object of the present invention to provide a wood working machine and a table translation apparatus for such wood working machine wherein a table can be repetitively moved at a comparatively high speed within a comparatively small distance to enhance the working efficiency for wood.

It is a further object of the present invention to provide a wood working machine and a table translation apparatus for such wood working machine wherein composite workings by a plurality of working heads can be performed efficiently.

In order to attain the objects described above, according to an aspect of the present invention, there is provided a table translation apparatus for a wood working machine wherein a carrier is mounted for leftward and rightward sliding movement on a beam secured to a pair of left and right columns and extending horizontally leftwardly and rightwardly and a plurality of working heads are mounted for upward and downward movement on the carrier, the table translation apparatus comprising a bed extending forwardly and backwardly below and perpendicularly to the beam, a table mounted for horizontal forward and backward sliding movement on the bed for moving a piece of wood placed thereon forwardly and backwardly so as to pass below the beam, a pair of front and rear screw shafts supported for rotation on a same straight line at a front portion and a rear portion of the bed and connected to be driven to rotate forwardly or reversely independently of each other by a motor, a pair of front and rear shuttles held in threaded engagement with the front and rear screw shafts, respectively, for being moved forwardly and rearwardly along a rail by forward or reverse rotation of the front and rear screw shafts, respectively, a front side clutch provided on the front side of the table for releasably connecting the table and the front side shuttle to each other, and a rear side clutch provided on the rear side of the table for releasably connecting the table and the rear side shuttle to each other, the table being moved forwardly or rearwardly by forward or reverse rotation of the front side screw shaft when the table is connected to the front side shuttle by the front side clutch whereas the table is moved forwardly or rearwardly by forward or reverse rotation of the rear side screw shaft when the table is connected to the rear side shuttle by the rear side clutch.

With the table translation apparatus, the screw shafts have a smaller length and allow higher speed rotation thereof than ever. Further, since the feeding speed of the table can be varied whether it is fed by the front side screw shaft or the rear side screw shaft, when a piece of wood must be worked by various working operations which should be performed at different feeding speeds such as, for example, cutting and drilling, the working operations can be performed efficiently.

Each of the front and rear side clutches may include a pair of clamp members operable by a pair of hydraulic cylinders for clamping a portion of a corresponding one of the front and rear side shuttles from the opposite left and right sides.

Preferably, the table translation apparatus further comprises front arid rear side positioning means for temporarily fixing the front and rear shuttles at respective predetermined positions on the bed in order to change over the connection by the front and rear clutches.

According to another aspect of the present invention, there is provided a wood working machine, which comprises a pair of left and right columns, a beam secured to the left and right columns and extending horizontally leftwardly and rightwardly, a pair of carriers mounted for leftward and rightward sliding movement on a front face and a rear face of the beam, a plurality of working heads mounted for upward and downward movement on each of the carriers, and a pair of table translation apparatus defined as above and disposed in a leftwardly and rightwardly juxtaposed relationship below the beam.

With the wood working machine, working operations for pieces of wood placed on the tables of the two table translation apparatus can be performed parallelly at a time and efficiently.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is an enlarged sectional view taken along line B—B in FIG. 3 showing the right side table translation apparatus.

DESCRIPTION OF THE PREFERRED EMBODIMENT

Figure 1:
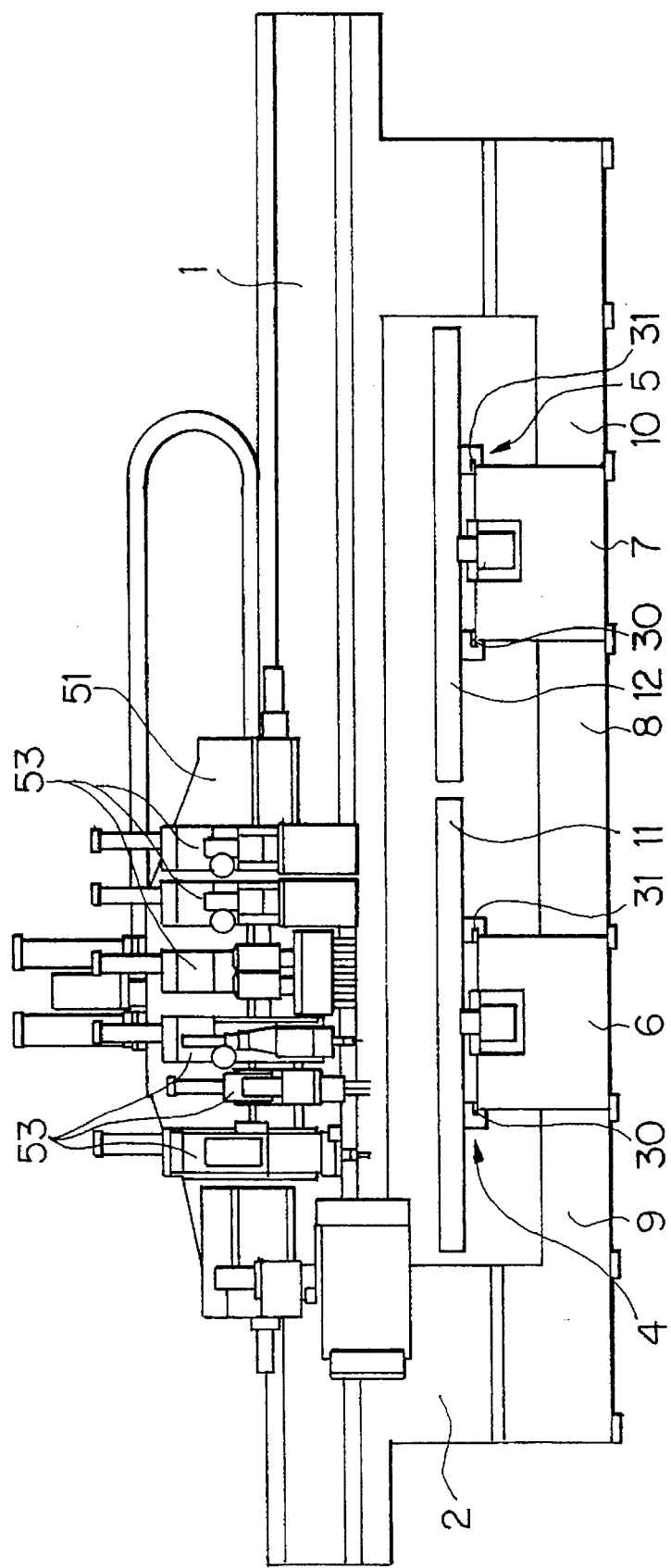
FIG. 1 is a front elevational view of a wood working machine showing a preferred embodiment of the present invention.
Figure 2:
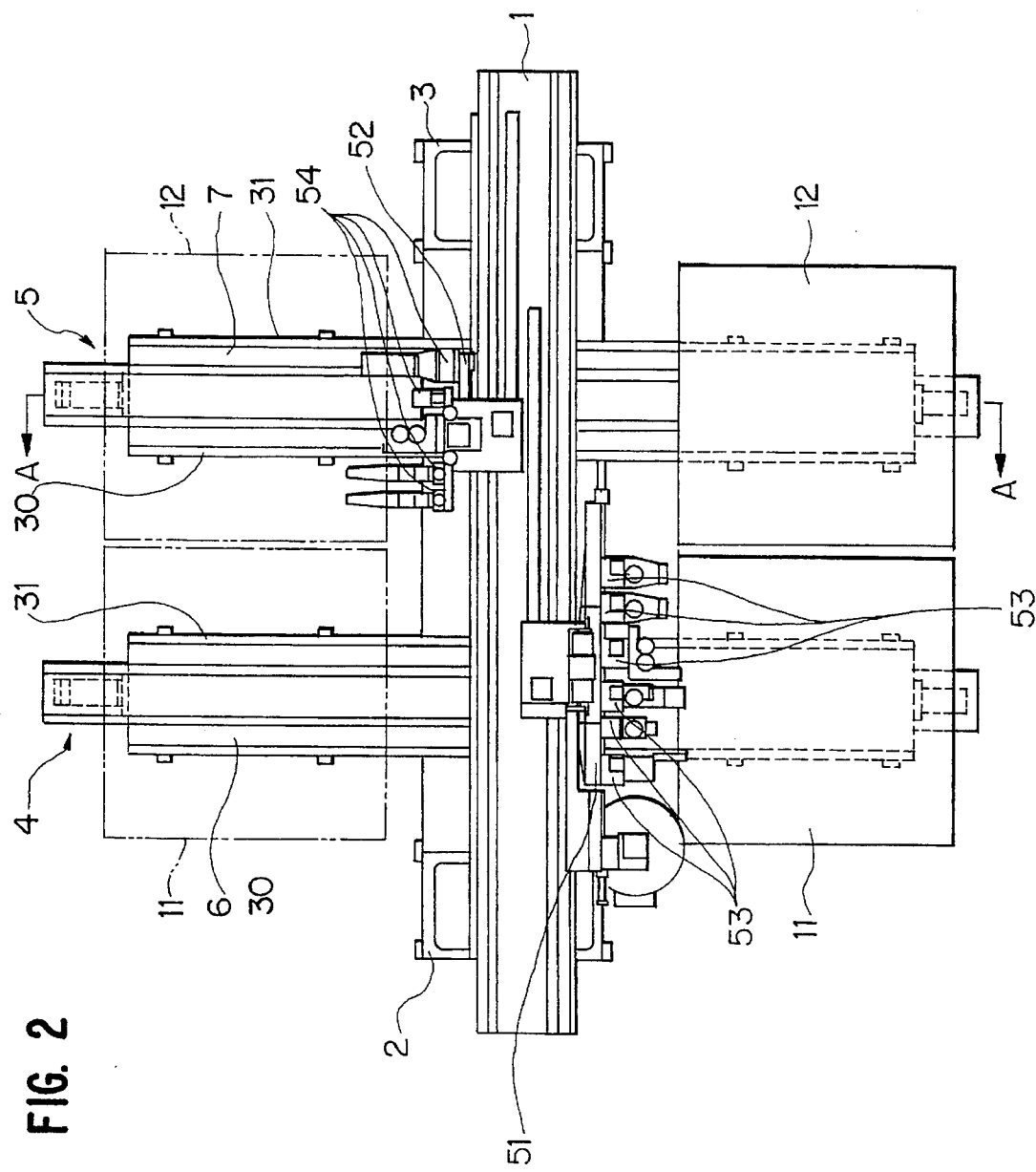
FIG. 2 is a plan view of the wood working machine of FIG. 1.

Referring first to FIGS. 1 and 2, there is shown a wood working machine to which the present invention is applied. The wood working machine includes a beam 1 extending long in the leftward and rightward directions and fixed horizontally by means of a pair of left and right columns 2 and 3. The beam 1 and the left and right columns 2 and 3 generally exhibit an arch-like profile. A pair of table translation apparatus 4 and 5 of a same structure are disposed in a leftwardly and rightwardly juxtaposed relationship below and perpendicularly to the beam 1 and have beds 6 and 7, respectively, which extend long in the depthwise direction or forward and backward directions in parallel to each other between the left and right columns 2 and 3. The beds 6 and 7 and the left and right columns 2 and 3 are interconnected into a unitary member by stays 8, 9 and 10.

A pair of tables 11 and 12 are mounted for forward and backward sliding movement on the beds 6 and 7 of the left and right table translation apparatus 4 and 5, respectively. Since mechanisms for moving the tables 11 and 12 forwardly and backwardly are same as each other between the two table translation apparatus 4 and 5, the structure of the right side table translation apparatus 5 will be described below with reference to FIGS. 3 and 4.

A gutter 13 is provided on the bed 7, and a pair of front and rear screw shafts 14 and 15 are supported for rotation horizontally on a same straight line in the gutter 13. Each of the screw shafts 14 and 15 has a length smaller than one half the length of the bed 5. The front side screw shaft 14 is supported for rotation at a front end and a rear end thereof on a pair of bearings 16 and 17 and is connected to a front side motor 18 provided on the outer side of the front end of the gutter 13. Meanwhile, the rear side screw shaft 15 is supported for rotation at a front end and a rear end thereof on a pair of bearings 19 and 20, respectively, and is connected to a rear side motor 21 provided on the outer side of the rear end of the gutter 13. The front and rear motors 18 and 21 are bidirectional motors so that the front and rear screw shafts 14 and 15 may be rotated forwardly and reversibly independently of each other. The bearing 17 at the rear end of the front side screw shaft 14 and the bearing 19 at the front end of the rear side screw shaft 15 are located adjacent each other below the beam 1.

A pair of front and rear shuttles 22 and 23 are held in threaded engagement with the front and rear screw shafts 14 and 15, respectively. The front side shuttle 22 is shown in detail in FIG. 4. The shuttle 22 includes a body 24, a nut 25 held on the body 24, a slider 26 securely mounted on the bottom face of the body 25, and a crest 27 securely mounted on the top face of the body 25. A groove 27a is formed on the left side face of the crest 27, and a hole 27b is formed in the right side face of the crest 27. The nut 25 is held in threaded engagement with the screw shaft 14, and the slider 26 is fitted, at a recessed portion 28 on the bottom face thereof, with a rail 29 securely mounted on the bottom face of the gutter 13. Consequently, the front side shuttle 22 is driven to move forwardly or backwardly along the rail 29 by forward or reverse rotation of the front side screw shaft 14. Also the rear side shuttle 23 has a same construction as the front side shuttle 22 and is driven to move forwardly or backwardly along the rail 29 by forward or reverse rotation of the rear side screw shaft 15.

Meanwhile, the table 12 is mounted horizontally on the bed 7 so that it may be slidably moved forwardly or backwardly along a pair of rails 30 and 31 provided in parallel to each other on the top face of the bed 7. A pair of front and rear clutches 32 and 33 are mounted in a predetermined spaced relationship from each other on the bottom face of the table 12.

The front side clutch 32 is shown in detail in FIG. 4. The clutch 32 includes a pair of left and right holders 34 and 35 having somewhat different structures from each other. The holders 34 and 35 are secured to a lower end portion of a bracket 36 provided vertically downwardly on the bottom face of the table 12 and are positioned within the gutter 13 in an opposing relationship to each other with a gap left therebetween which is sufficient to allow a portion of the crest 27 of the shuttle 22 to pass therethrough.

A plunger chamber 37 is formed in the left side holder 34, and a clamp plunger 38 is fitted for sliding movement in a horizontal direction in the plunger chamber 37. A compression spring 40 is disposed between a flange portion of the clamp plunger 38 and a lid plate 39 for the plunger chamber 37. A cylinder 41 which is operated by a hydraulic pressure (pneumatic pressure or oil pressure) is mounted on the outer side of the holder 34 by way of a bracket 42. The axis of the cylinder 41 is offset from the axis of the plunger chamber 37. A piston rod 41a of the cylinder 41 and the clump plunger 38 are connected to each other by way of a link 43 so as to construct a toggle mechanism. When the cylinder 41 is rendered operative to move the clamp plunger 38 against the spring 40, an end portion of the clamp plunger 38 is fitted into the groove 27a of the crest 27 of the shuttle 22 through a hole formed in the lid plate 39 for the plunger chamber 37.

On the other hand, a guide hole 44 is formed in the right side holder 35, and a cylinder 45 which is operated by a hydraulic pressure (pneumatic pressure or oil pressure) is mounted on the outer face of the holder 34. A clamp head 47 is secured to an end of a piston rod 46 of the cylinder 45 and is fitted for sliding movement in the guide hole 44. When the clamp head 47 is pushed by the cylinder 45, the end portion of the clamp head 47 is fitted into the hole 27b of the crest 27.

Since the operation of the clamp head 47 on the right side and the operation of the plunger 38 on the left side described above are performed at a same time, the crest 27 is held between the clamp plunger 38 and the clamp head 27. When the crest 27 of the front side shuttle 22 is held in this manner, the table 12 is connected to the front side shuttle 22 and is slidably moved forwardly or backwardly by energization of the front side motor 18. When the clamp plunger 38 and the clamp head 47 are moved away from the crest 27 at a same time to release the crest 27, the table 12 is disconnected from the front side shuttle 22.

While also the rear side clutch 33 has the same structure as the front side clutch 32, the rear side clutch 33 performs connection of the rear side shuttle 23 to the table 12, and the front and rear side clutches 32 and 33 are used alternatively. In particular, in order to move the table 12 principally forwardly of the beam 1 with reference to the beam 1, the table 12 is connected to the front side shuttle 22 by the front side clutch 32, but in order to move the table 12 principally rearwardly of the beam 1, the table 12 is connected to the rear side shuttle 23 by the rear side clutch 33.

Since the front and rear side clutches 32 and 33 are provided in a predetermined spaced relationship on the bottom face of the table 12 as described above, in order to perform changing over between the front and rear side clutches 32 and 33, the front and rear side shuttles 22 and 23 must be positioned at respective predetermined positions. Therefore, in order to perform changing over between the front and rear side clutches 32 and 33 in a condition wherein the table 12 is positioned just below the beam 1, depthwise positioning means for individually positioning the front and rear side shuttles 22 and 23 are provided in the gutter 13 of the bed 7.

The front side positioning means is shown in FIG. 4. Referring to FIG. 4, a positioning cylinder 48 which is operated by a hydraulic pressure (pneumatic pressure or oil pressure) is secured to an inner side face of the gutter 13, and a positioning hole 49 is formed in a side face of the front side shuttle 22. An end portion of the piston rod 50 of the cylinder 48 is fitted into the hole 49 to fixedly position the front side shuttle 22 at a predetermined position on the front side screw shaft 14. While the rear side positioning means is not shown, it has the same structure as the front side positioning means, and the rear side shuttle 23 is fixedly positioned at a predetermined position of the rear side screw shaft 15.

Referring back to FIG. 3, after the front and rear side shuttles 22 and 23 are positioned and fixed at a time in this manner, the on/off conditions of the front and rear side clutches 32 and 33 are changed over so that one of the clutches 32 and 33 which has held a shuttle thereon releases the shuttle while the other clutch 33 or 32 which has not held a shuttle thereon now holds the shuttle. Consequently, that one of the front and rear side shuttles 22 and 23 which is connected to the table 12 is changed over. If the piston rod 50 of the cylinder 48 is removed from the hole 49 of the shuttle in both of the front and rear side positioning means, then the table 12 is moved by movement of that one of the shuttles which has been connected newly. It is to be noted that, though not shown, a pair of sensors for detecting that the front and rear side shuttles 22 and 23 are positioned at such positions as described above are provided in the gutter 13.

While the description has been given above of the right side table translation apparatus 5, also the left side table translation apparatus 4 has the same structure. The left and right side table translation apparatus 4 and 5 can move the tables 11 and 12 independently of each other, respectively.

Figure 3:
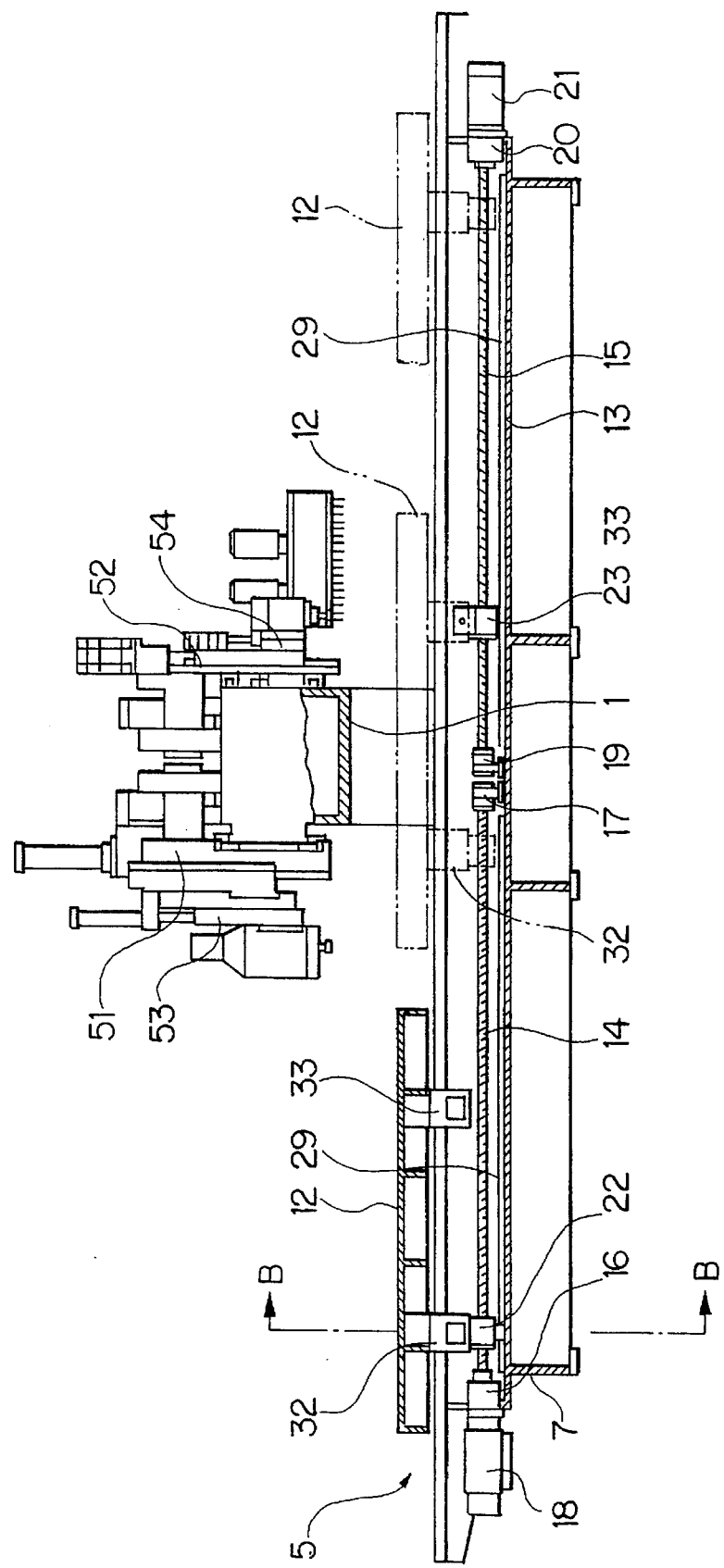
FIG. 3 is a side elevational view of the wood working machine of FIG. 1 showing a right side table translation apparatus in a cross section taken along line A—A in FIG. 2.

Referring to FIGS. 1 to 3, a pair of front and rear carriers 51 and 52 are mounted for individual leftward and rightward sliding movement on the front face and the rear face of the beam 1. A plurality of working heads 53 principally for cutting wood by means of a router or a like element are mounted for upward and downward sliding movement in a leftwardly and rightwardly juxtaposed relationship on the front side carrier 51. Meanwhile, another plurality of working heads 54 principally for drilling wood by means of a drill or a like element are mounted similarly for individual upward and downward sliding movement in a leftwardly and rightwardly juxtaposed relationship on the rear side carrier 52.

Since the left and right side table translation apparatus 4 and 5 can be moved independently of each other as described hereinabove, while two pieces of wood are placed separately on the left and right side tables 11 and 12, cutting of one of the two pieces of wood by the front side working head 53 and drilling of the other piece of wood by the rear side working head 54 can be efficiently performed parallelly at a time. In this instance, the table on which the piece of wood to be cut by the front side working head 53 is moved by the front side screw shaft 14, and the other table on which the other piece of wood to be drilled by the rear side working head 54 is moved by the rear side screw shaft 15. Since the lengths of the screw shafts 14 and 15 are smaller than one half the length of the beds 4 and 5, the screw shafts 14 and 15 can be rotated at a higher speed than an alternative screw shaft which is formed by linearly connecting the screw shafts 14 and 15 to each other. The tables 11 and 12 thus can be moved at high speed independently of each other to work wood rapidly.

Further, also cutting and drilling for a single piece of wood can be performed by changing over the movement of the table 11 or 12 from the movement by the front side screw shaft 14 to the movement by the rear side screw shaft 15 or vice versa. While the feeding speed of wood is different by a great amount between cutting and drilling (high in cutting and low in drilling), since the tables 11 and 12 are moved separately by the front and rear screw shafts 14 and 15 forwardly and rearwardly of the beam 1 as described above, where both of cutting and drilling are required for a same piece of wood, they can be performed efficiently.

Having now fully described the invention, it will be apparent to one of ordinary skill in the art that many changes and modifications can be made thereto without departing from the spirit and scope of the invention as set forth herein.

What is claimed is:

1. A table translation apparatus for a wood working machine wherein a carrier is mounted for leftward and rightward sliding movement on a beam secured to a pair of left and right columns and extending horizontally leftwardly and rightwardly and a plurality of working heads are mounted for upward and downward movement on said carrier, comprising:

a bed extending forwardly and backwardly below and perpendicularly to said beam;

a table mounted for horizontal forward and backward sliding movement on said bed for moving a piece of wood placed thereon forwardly and backwardly so as to pass below said beam;

a pair of front and rear screw shafts supported for co-axial rotation at both a front portion and a rear portion of said bed and connected to be driven to rotate forwardly or reversely independently of each other by a motor;

a pair of front and rear shuttles held in threaded engagement with said front and rear screw shafts, respectively, for being moved forwardly and rearwardly along a rail by forward or reverse rotation of said front and rear screw shafts, respectively;

a front side clutch provided on the front side of said table for releasably connecting said table and said front side shuttle to each other; and a rear side clutch provided on the rear side of said table for releasably connecting said table and said rear side shuttle to each other;

said table being moved forwardly or rearwardly by forward or reverse rotation of said front side screw shaft when said table is connected to said front side shuttle by said front side clutch whereas said table is moved forwardly or rearwardly by forward or reverse rotation of said rear side screw shaft when said table is connected to said rear side shuttle by said rear side clutch.

2. A table translation apparatus as claimed in claim 1, wherein each of said front and rear side clutches includes a pair of clamp members operable by a pair of hydraulic cylinders for clamping a portion of a corresponding one of said front and rear side shuttles from the opposite left and right sides.

3. A table translation apparatus as claimed in claim 1, further comprising front and rear side positioning means for temporarily fixing said front and rear shuttles at respective predetermined positions on said bed in order to change over the connection by said front and rear clutches.

4. A wood working machine, comprising:

a pair of left and right columns;

a beam secured to said left and right columns and extending horizontally leftwardly and rightwardly;

a pair of carriers mounted for leftward and rightward sliding movement on a front face and a rear face of said beam;

a pair of working heads mounted for upward and downward movement on each of said carriers; and a pair of table translation apparatus comprising:

a bed extending forwardly and backwardly below and perpendicularly to said beam;

a table mounted for horizontal forward and backward sliding movement on said bed for moving a piece of wood placed thereon forwardly and backwardly so as to pass below said beam;

a pair of front and rear screw shafts supported for co-axial rotation at both a front portion and a rear portion of said bed and connected to be driven to rotate forwardly or reversely independently of each other by a motor;

a pair of front and rear shuttles held in threaded engagement with said front and rear screw shafts, respectively, for being moved forwardly and rearwardly along a rail by forward or reverse rotation of said front and rear screw shafts, respectively;

a front side clutch provided on the front side of said table for releasably connecting said table and said front side shuttle to each other; and a rear side clutch provided on the rear side of said table for releasably connecting said table and said rear side shuttle to each other;

said table being moved forwardly or rearwardly by forward or reverse rotation of said front side screw shaft when said table is connected to said front side shuttle by said front side clutch whereas said table is moved forwardly or rearwardly by forward or reverse rotation of said rear side screw shaft when said table is connected to said rear side shuttle by said rear side clutch;

said table translation apparatus disposed in a leftwardly and rightwardly juxtaposed relationship below said beam.

* * * * *